ALTERNATING CURRENT TELEPHONE SIGNALING SYSTEM

Filed June 7, 1947 2 SHEETS—SHEET 1

L LL IC ICR OR O AKA G BA C CR CY B RC

Inventors
Edmund Philip Goodwin Wright
William John Reynolds
By R. P. Morris
Attorney April 22, 1952 E. P. G. WRIGHT ET AL 2,593,512

ALTERNATING CURRENT TELEPHONE SIGNALING SYSTEM

Filed June 7, 1947 2 SHEETS—SHEET 2

Inventors.
Edmond Philip Goodwin Wright
William John Reynolds
By R P Morris
Attorney Patented Apr. 22, 1952 2,593,512

UNITED STATES PATENT OFFICE 2,593,512

ALTERNATING CURRENT TELEPHONE SIGNALING SYSTEM

Esmond Philip Goodwin Wright and William John Reynolds, London, England, assignors to International Standard Electric Corporation, New York, N. Y.

Application June 7, 1947, Serial No. 753,220
In Great Britain August 16, 1939

Section 1, Public Law 690, August 8, 1946
Patent expires August 16, 1959

10 Claims. (Cl. 179—16)

Figure 1:
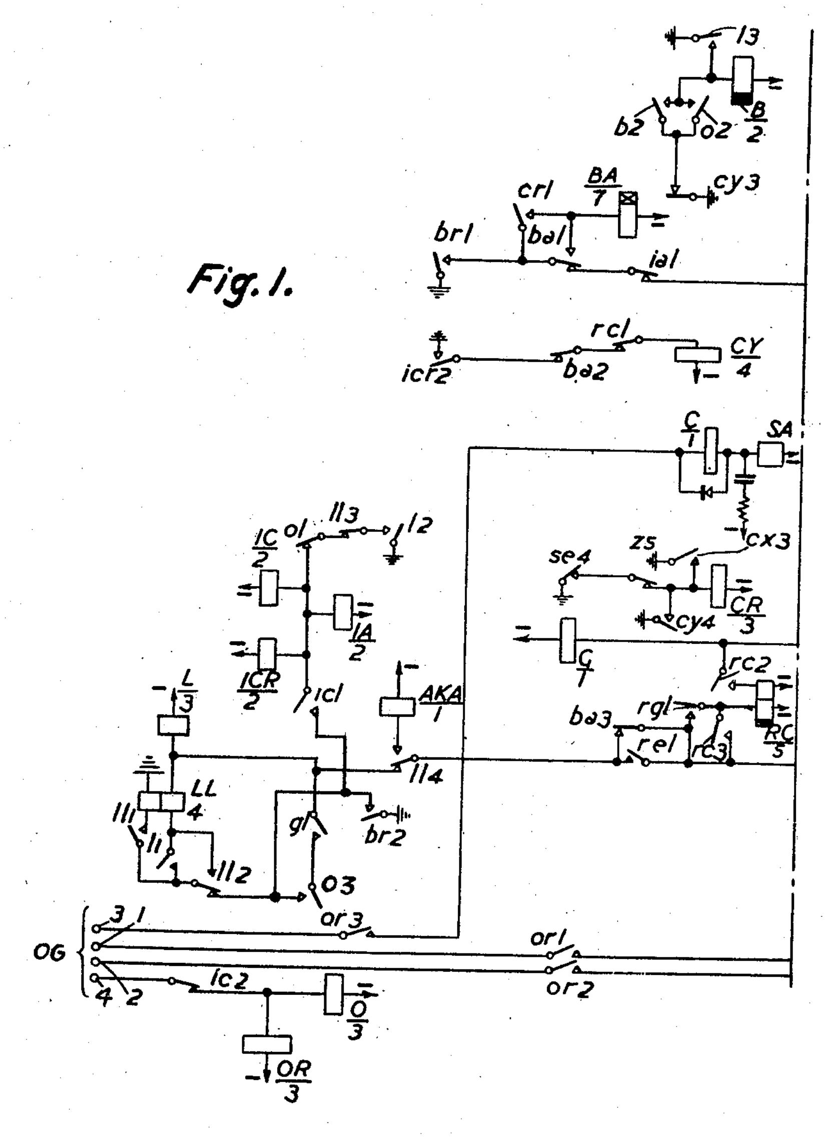

This invention relates to toll or long distance telecommunication exchange system.

Systems including voice frequency currents for signalling purposes are known. In such a system, if a supervisory signal is transmitted during the time in which it is possible to transmit voice currents over the connection, the supervisory signal is preceded by a prefix comprising a pulse of voice frequency current, preferably of two different frequencies, which is unlikely to be simulated by speech currents. Assuming that a prefix signal is transmitted from exchange A to exchange B, then in response to a predetermined portion of the prefix signal, a signal-receiving equipment at B breaks the connection so that neither the complete prefix or any subsequent supervisory signal is transmitted beyond exchange B. Similarly, in the case of reply signals, the reception of a prefix signal by A breaks the connection so that the calling subscriber does not receive the signal. Before commencing to transmit, the line is broken to avoid near end interference, while the object of breaking the connection beyond the signal receiving equipment is to prevent interference at the signal receiving station, due to speech currents in the circuit beyond the receiving station and also to ensure that the supervisory signals are not transmitted beyond the station for which they are intended. Certain supervisory signals necessitate transmision of an acknowledgment signal back to the station initiating the supervisory signal. If the signal transmitting station does not receive this acknowledge signal it continues to transmit its supervisory signal until it is duly acknowledged by the receiving station.

The prefix pulse may consist of two frequencies, known as X and Y frequencies, transmitted for a minimum period, such as a pulse comprising the frequencies of 600 and 750 cycles per second sent for a period of about 250 milliseconds. The short impulses used for dialling and all other signals when speech currents cannot be transmitted over the line and also the impulses used for supervisory signals following a two frequency prefix may comprise one frequency only. If a single frequency is used for these signalling pulses it is possible to detect and reproduce them with a minimum of distortion.

The prefix performs two successive operations after it has persisted for a predetermined time. The signal receiving equipment at each signalling station in the connection breaks the connection ahead. No further signal current will be received at the second and subsequent signalling stations which will after a time restore the connection. The first signalling station continues to receive the prefix signal, and if the signal persists for a further period the disconnection is maintained and the supervisory signal receiving equipment is connected up.

If a voice frequency system is in use in which a prefix signal is not applied prior to the selective impulses, it is necessary that the termination shall be sensitive to signal frequency pulses during the dialling period. Extensive research has shown that very considerable interference due to signal frequencies in speech will arise when the termination is in this condition. To avoid this difficulty it has been the practice to disconnect the toll line from any interfering source of speech prior to answering. This has been done by introducing a one-way amplifier between the calling operator and the toll line which is designed to pass tones back to the operator, but to prevent any speech passing forward. If use is not made of a device of this type equivalent precautions have to be taken. After the required subscriber has replied it is necessary that both-way speech should be possible on the line and the one-way amplifier must therefore be removed from circuit. The only signal which can conveniently be used for this operation is the one which is received when the called subscriber lifts his receiver and which is normally used for supervision and metering. This signal is obtained from the incoming automatic equipment as a direct current signal, which may consist, for example, of a reversal of polarity on the positive and negative lines. In many automatic areas this signal is not provided at all in certain classes of call, as for example in calls to special service operators, to interception operators and the like. It follows that difficulty arises when a system, requiring this signal for the removal of a one-way amplifier or similar device, is used on a call which is completed to such operators. When this occurs the operators have to be given instructions to extend an answer signal if they receive calls of this class. Since, however, this answering signal is identical with the metering signal, if the voice frequency system is in use with subscriber dialling the necessity for applying the signal in order to remove a protective device means that the calling subscriber will be incorrectly metered for the call which may not yet have been completed to the required subscriber.

It has been found that the various alternative arrangements to the one-way amplifier device also ultimately require either an answering signal or an end of selection signal before the toll line can be switched through. On the other hand, if, in accordance with the present invention, it is arranged that selective impulses be always preceded by a prefix, toll line termination can be made insensitive to single frequency signals immediately after the initial call signal has been received. Recent research indicates that signals of the type consisting of a mixed frequency prefix followed by single frequency suffixes cannot be successfully imitated by the voice. There is therefore no necessity to take precautions to prevent speech frequencies getting on to the toll line during the dialling period since they cannot cause false signals.

Impulse regenerators offer some interesting possibilities in connection with voice frequency dialling. These regenerators function to store and re-transmit impulses. Because the incoming impulses may vary in speed it is usual for the regenerators to make a short delay before commencing to send a digit which is being received. This principle makes it possible to prepare the outgoing end of the line for impulsing and permits the incoming receiver to settle down after any disturbance which may be caused at the commencement of the first impulse. In a similar way the regenerator at the incoming end may be used to dis-associate the D. C. portion of the circuit and, in consequence, prevent the condenser discharge from reacting on the incoming receiver. On subscriber dialling systems the use of a prefix before each digit is a most convenient method of avoiding the use of signals to arrange the speech condition. With this arrangement the circuits are normally in the speech condition and are completed for the dialling condition temporarily. This technique requires the storage of impulses at the outgoing end which is adequately accomplished by a regenerator. The disadvantage of the regenerator method is the delay period introduced before sending the first digit, but such a delay is encountered frequently on register and other systems.

The prefix before dialling has two other useful functions, after transmitting a digit the selector equipment at the incoming end may search for and seize a free circuit of another group. Unless a one way amplifier device is fitted the dial impulses of the first portion will pass into the second portion and if this is fitted with a voice frequency receiver, the impulse as repeated will be distorted by the original impulse. On the other hand the receipt of the prefix signal splits the line as shown later thereby preventing the impulse from passing out to the second portion of the circuit. If both portions of the circuit are arranged for voice frequency operation it may be preferable to swtich them together for end to end signalling. At the time when the second portion of the circuit is ready for dialling, the transmission of the next series of impulses may have already started, although due to the response time of the receiver there is yet no indication in the direct current portion of the circuit. If the circuit is switched into the transit position whilst in this condition, this fact would mean that the first impulse may be seriously curtailed. The prefix to dialling however may be long enough to allow a time equal to the response time of the receiver to be deducted without making the signal unrecognizable, so that if there is no record of the prefix being present the connection can be safely switched through.

Figure 2:
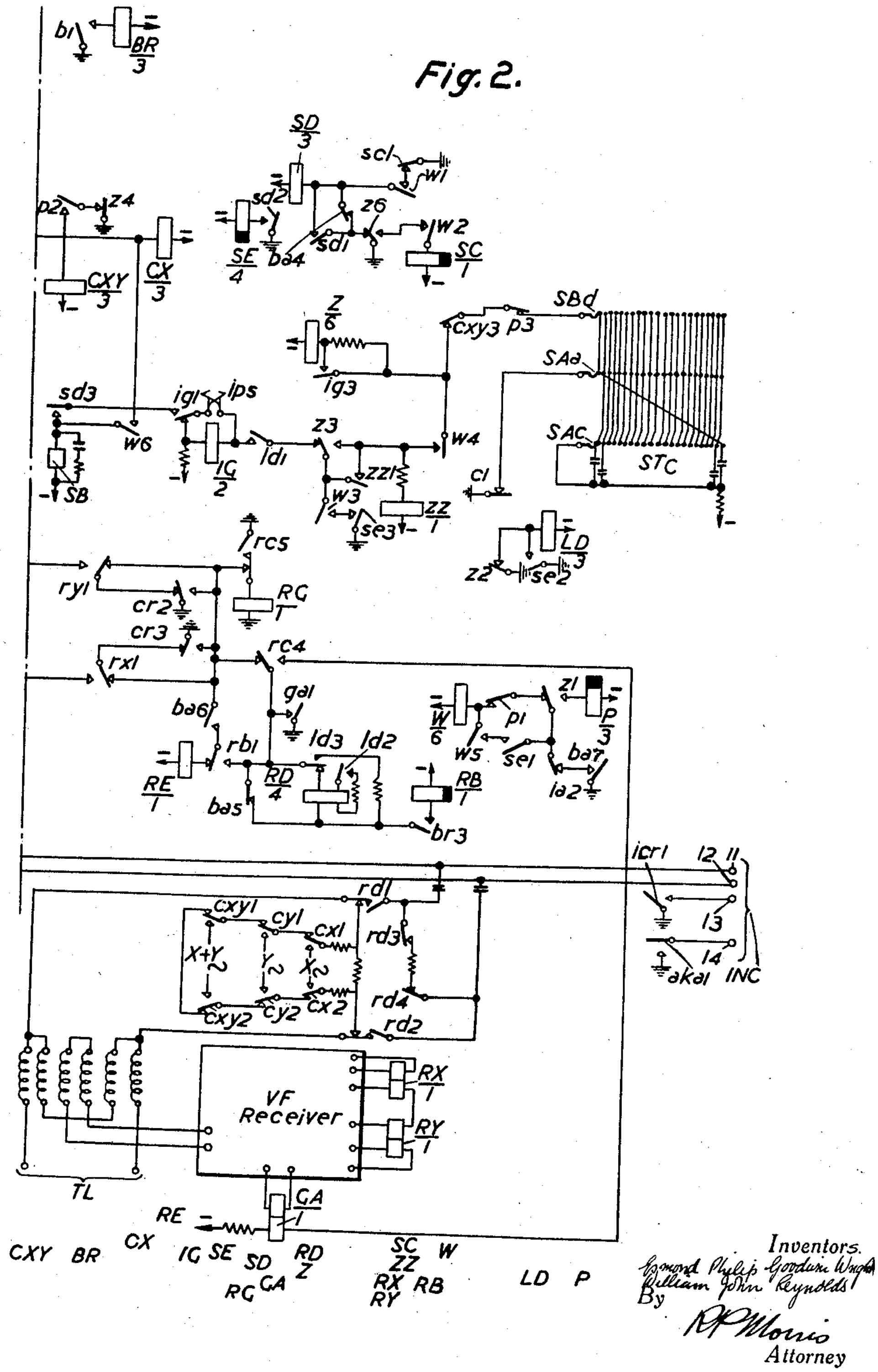

In order that the invention may be clearly understood, a description will be given of one of its embodiments, reference being made for this purpose to the accompanying drawing, in which Figs. 1 and 2 are complementary portions of a circuit diagram of part of the termination associated with a bothway toll line adapted for automatic service using voice-frequency signalling. Figs. 1 and 2 are to be placed side by side in the order named.

The various relays in the figures are noted at the bottom of each figure and can be easily located in the drawing by following a vertical line up from the point at the bottom at which the notation occurs. When an outward call is to be made, access is obtained from an outgoing circuit OG in the automatic exchange which applies direct current conditions to the terminating circuit; these conditions are transformed into voice-frequency signals which are transmitted over the toll line TL. On the other hand when an inward call is made on the toll line TL the controlling signals are received in the form of voice-frequency pulses and are converted by the terminating circuit to direct current signals, which serve to control an incoming circuit INC and give access to incoming selectors in the automatic exchange.

*Outgoing call*

The Z relay (Fig. 2) is held operated before the call commences in a circuit from battery over its winding, *cxy*3 back, *p*3 back, SB*d* wiper, SA*a* wiper, *c*1 back, to earth.

When an outgoing call commences an earth is applied from the outgoing circuit OG to lead 4 which causes the operation of relays O and OR through *ic*2 back. The positive and negative lines 1 and 2 from the outgoing circuit are connected toward the toll line TL at *or*1 front and *or*2 front. At *o*2 a circuit is closed for relay B, which operates; *b*1 causes the operation of relay BR (Fig. 2). Contacts *br*1 extend a circuit to operate relay CX (Fig. 2) from earth, *br*1 front, *ba*1 back, *ia*1 back, winding of CX to battery, and *cx*1 and *cx*2 (bottom of Fig. 2) apply X frequency through *rd*1 back and *rd* 2 back to the line TL and this is received at the distant end as a calling signal. The closing of contacts *cx*3 operates CR, and *cr*1 operates the slow to operate relay BA from earth, *br*1 front, *cr*1 front, winding of BA to battery; *ba*1 then locks BA and also opens the circuit of CX so that this relay will release followed by CR; the calling pulse of X frequency ceases with release of CX.

When *br*3 operated, relay RB (Fig. 2) operated over *ba*5, *rc*4 back, to earth over *rx*1 back and *ry*1 back and the back contacts of *cr*3 and *cr*2; and when relay BA operates, *ba*5 removes the short circuit on relay RD which will now operate over the same circuit. Contacts *rd*1 and *rd*2 connect the toll line to the terminating circuit. When the distant end of the toll line is ready for dialling to commence, it sends back a pulse of Y frequency which is received in the voice frequency receiver (indicated as VF receiver) over the transformer windings and causes the operation of RY. The contact of RY extends an earth to relay G over *cr*2 back, *ry*1 front, winding of G and battery and *g*1 operates L over a circuit from earth, *br*2 front, *o*3 front, *g*1 front, winding of L to battery. L provides itself a holding circuit at *l*1; and at the end of the Y frequency pulse, when RY and G release, relay LL operates in series with L over *l*1 front, *ll*2 back and locks over *ll*1.

The selective impulses from the dial are repeated to the termination from the outgoing circuit OG as earth pulses on lead 3. These will cause the switch SA to step once in response to each impulse; relay C operates at the beginning of the digit and remains up during impulsing. In this condition of the call the two switches SA and SB are used to store and count out the digit respectively. The commoning between the banks of the two switches is such that the operation will be identical whatever may be the position of switch SA at the beginning of the digit. During the time that SA is responding to the impulses, earth on the SA*a* wiper is disconnected at contacts *c*1, but at the end of the digit when *c*1 recloses, earth connected to this wiper will charge one of the storage condensers STC connected to bank SA*c*. When a further digit is received the operation is repeated, so that a sequence of digits will result in charges being left on condensers spaced on contacts separated by a number of contacts corresponding to the number of impulses in the successive digits.

As will be seen later switch SB always lines up with switch SA at the end of a sequence of operations and when this condition is achieved relay Z will be operated over *cxy*3, wiper SB*d* to earth on wiper SA*a*. As soon as SA steps in response to a digit, the holding circuit of Z is opened and this relay will release. When the circuit was seized *ba*5 closed a circuit for relay P over the operated contact *z*1 and now, when Z releases, P will commence to release slowly; over *z*4 and *p*2 a circuit is closed for CXY during the slow release of P. The closing of contacts *z*2 causes the operation of LD, and *ld*2 and *ld*3 disconnect the circuit of RD so that this relay releases quickly and connects the toll line circuit to the contact of the signal relays at *rd*1 and *rd*2. The operation of contacts *cxy*1 and *cxy*2 therefore connects to the toll line a signal consisting of a mixture of X and Y frequencies. The timing of P is such that this signal will last approximately 260 milliseconds. When P releases, CXY releases to terminate the signal and *p*1 closes a circuit for relay W through winding of W, *p*1 back, *z*1 back, *ia*2 back, *ba*7 front, to earth, which initiates the sending of the digit which has been stored on STC. The closing of contacts *w*1 operates SD, and *sd*2 operates SE. The circuit is now closed over *se*3 front, *w*3 front, and *ld*1 front for relay IG, which will operate on the first break of the machine impulse springs IPS. As soon as contacts *ig*1 change over the machine springs extend earth pulses in the above circuit and step SB over *sd*3 up, and these pulses are also connected over *w*6 up to relay CX, which will operate in parallel with SB. The switch SB therefore steps at 10 impulses per second and CX operates at each step and its contacts *cx*1 and *cx*2 apply pulses of X frequency to the line *t*1 corresponding to the percentage make of the machine impulse springs. The number of these pulses corresponds to the number of the impulses received from the outgoing circuit since SB will be stopped when it reaches an outlet corresponding to that marked by SA at the end of the digit.

The contacts *w*4 connect relay ZZ to wiper SB*d* through *cxy*3 back and *p*3 back. This relay is a sensitive relay which will operate to the discharge of a condenser and when wiper SB*d* reaches a contact which via the commoning to SA is connected to a charged condenser, the condenser discharges through ZZ and causes that relay to operate and lock over *zz*1 front, *w*3 front, *se*3 front, to earth. A circuit is now closed by *zz*1 for Z to operate in parallel with ZZ. Z and ZZ will therefore hold. Z operates P over *z*1 front, *ia*2 back, *ba*7 front, to earth.

Assuming a further digit has been received by SA and SB has not lined up with SA, then the operation is as follows:

Contacts *z*6 close a circuit for the operation of relay SC and when *sc*1 opens relay SD will release followed by relay SE. Since *z*1 has already operated, P will be energised and the release of *se*1 will open the holding circuit of relay W which will fall back. At the same time *se*2 releases LD, so that the contacts *ld*3 and *ld*2 complete the circuit for RD which operates. When contacts *se*3 release, however, the holding circuit of Z will be opened and Z and ZZ will release. The circuit of SC is opened when *w*2 releases. SC falls back and *sc*1 prepares the circuit over which SD operates at the beginning of sending the next digit. It will be found that the circuit is now in exactly the same condition as it was at the beginning of sending the first digit and therefore the release of Z at this time will cause the release of P and initiate the sending of the second digit after a mixed frequency prefix has been connected to the line.

When SB reaches the outlet marked by SA at the end of the last digit there will be earth over *c*1 on the corresponding outlet of SA and in this case Z will operate to such earth, independent of the condenser charge over *cxy*3 back, *p*3 back, SB*d* wiper, SA*a* wiper, *c*1 back. If this happens, Z will remain up until a further digit is received. If no further digits are received the switches SA and SB will have lined up as described above, relay ZZ and Z will operate.

*Incoming call*

The operation of the termination will now be described for an incoming call. It will be appreciated that an exactly similar circuit is connected to the distant end of the toll line and the following description will apply to that distant end during the operation described in the previous section for an outgoing call.

The calling signal consists of a short pulse of X frequency which is received in the voice frequency receiver and causes the operation of relay RX. The contact of this relay extends earth from *cr*3 back over *ba*3, *ll*4 back, winding of L, to operate relay L, which locks at *l*1 and at *l*3 operates B which at *b*1 operates BR. At the end of the X frequency pulse when RX releases, relay LL will operate in series with L, since up to this moment it has been short-circuited by the earth over the contact *rx*. At *l*2 there is provided a circuit for relays IC, ICR and LA and these will all hold over *ic*1. At *icr*2 a circuit is closed for CY over *ha*2 back and *rc*1 back, which operates and connects Y frequency to the line at *cy*1, *cy*2. This functions as an acknowledgment to the calling signal indicating to the distant end that the incoming circuit has been seized. B operates over *l*3 and BR operates over *b*1, so that when CR operates over the circuit provided by *cy*4, it closes a circuit at *cr*1 for relay BA which operates and holds over *ba*1. It will be noted that the circuit for CX over *br*1 was opened by contact *ia*1. The operation of *ba*2 breaks the circuit of CY which will release. The contacts *cy*1 and *cy*2 disconnect Y frequency from the line so that the signal ceases, while *cy*4 releases CR. When contacts *br*3 operated, a circuit was closed for relay RB over *ba*5 to earth on the back contacts of *cr*2 or *cr*3.

When *ba*5 opens, RD operates in series with RB, which holds. The contacts *rd*1 and *rd*2 disconnect the signal contacts from the line and connect the toll line through to the incoming circuit INC on leads 11 and 12. This incoming circuit, which may consist of an automatic selector or similar device, is seized by earth on lead 13 when *icr*1 operates.

As described above the selective pulses on the toll line are transmitted as pulses of X frequency preceded by a long pulse of mixed X and Y frequency. The reception of such a signal is as follows:

The group of relays RB, RC, RD, RE and RG are concerned with the identification of the long pulse of mixed frequency which will be referred to as a prefix. When mixed X and Y frequencies are received on the line, the voice frequency receiver causes the operation of relays RX and RY. When both these relays have operated their contacts remove the earth which short-circuited relay RG, RG will therefore operate in series with relays RD and RB. Contacts *rg*1 close the circuit for RC to the front contact *rx*1 and RC operates and will hold over *rc*3 and *rc*2 until the end of the prefix, when both relays RX and RY release. The contacts *rc*5 open the circuit of RG which will therefore release; it is short-circuited by *rc*5 up in order that it shall be sufficiently slow in release to ensure that RC has made both its holding contacts. The operation of *rc*5 also disconnects the circuit of RB and RD. Relay RD has a release time of approximately 110 milliseconds and its contacts *rd*1 and *rd*2 disconnect the toll line circuit after the signal has continued for this period. This device is only of value in built-up connections where it is necessary to prevent a complete prefix over-flowing on to a subsequent section of the connection and possibly causing an incorrect signal to be received further along the line. With voice frequency systems of the type under consideration the length of mixed frequency signal which can pass over a built-up connection during the release time of any RD relay is insufficient to be recorded as a signal at any subsequent point in the line.

Relay RB has a release time of approximately 220 milliseconds and will release when the mixed frequency signal has continued for this length of time. The mixed frequency signal is recognised as a prefix when relay RB releases. At the end of the prefix relays RX and RY will release. Since *rb*1 is now back, a circuit will be closed over back contacts of the signalling relays for relay RE which operates. It should be noted that the timing of relay RC is such that it will remain up during the period between the end of the prefix and the beginning of the X pulses which comprise a digit and also during the reception of these impulses. The selective pulses of X frequency are received in the voice frequency receiver which causes relay RX to respond. Relay RE is maintained operated, since RY is still unoperated. Contact *rx*1 therefore repeats the incoming impulses over *rc*1, *ll*4 to relay AK*a*; and at *aka*1 these pulses are extended to the incoming circuit over lead 14 where they cause the operation of the selector or other device.

It will be noted that although the calling signal is a pulse of single frequency, once this has been received and relay BA has operated, the circuit will not respond to any signals unless these are preceded by a mixed frequency prefix.

Relay GA is a sensitive relay which is operated from the voice frequency receiver when non-signal frequencies are detected. In other words relay GA is designed to respond to non-signal frequencies and not to respond to any of the signal frequencies and it is made sensitive so as to detect weak non-signal frequencies. It is used to make signals inoperative if they occur at a moment when non-signal frequencies are on the line. This is considered advisable since a mutilated signal might give rise to a false indication. If a prefix signal has been identified and RC operates, no further action will occur since contacts *ga*1 close a circuit which holds GA, RB, and RD. Therefore, if GA operates to extraneous frequencies before RB has released, it will maintain RB and prevent the signal being effective. The circuit will remain in this condition until contacts *rc*4 release and break the holding circuit of GA.

What is claimed is:

1. A telecommunication system in which a long distance connection is established by means of trains of impulses comprising an impulse-sending device responsive to trains of impulses received from the calling line, delay means connected to said device to delay the transmission of each digit, and signalling means, responsive to the initiation of trains of impulses received from the calling line, for inserting a prefix to introduce relay changes preparing a receiving device for the reception of impulses before said impulse-sending device operates.

2. A system as claimed in claim 1, in which each digit consists of a train of single-frequency impulses and the prefix consists of a compound frequency impulse.

3. A telecommunication system comprising a calling station and a called station, signalling means at said calling station for transmitting voice frequency currents for the transmission of digits for establishing long distance connections between said calling station and said called station, means at said calling station for transmitting a predetermined prefix impulse before each digit, a device at said called station responsive only to said predetermined prefix before each digit, and control means for making said device slow to release in order that it may be maintained operated during the reception of a train of impulses.

4. A telecommunication exchange system, as defined in claim 3, further comprising a receiving system, and switching means under control of the prefix responsive device for holding the receiving circuit disconnected from the line during the operation of said device.

5. A long distance telecommunication exchange system employing voice-frequency currents for the transmission over a long distance conversational channel of digits for setting up a connection, comprising transmitting means at one end of the channel for sending a predetermined preparatory prefix impulse followed by digit impulses, receiving means at the other end of the channel for receiving said impulses, and means at said other end of the channel responsive to the prefix impulse of each digit for preparing the said receiving means for the reception of said digit, and means for returning said receiving means to an unreceptive condition after each digit has been received in a time less than the minimum interdigital period.

6. A system as claimed in claim 5, in which said transmitting means comprises an equipment arranged to receive digits as direct current signals from a calling position and to re-transmit each digit as voice frequency alternating current impulses with the said preparatory impulse prefixed thereto.

7. A system as claimed in claim 5, in which the said receiving equipment comprises means for transmitting the digit impulses, which are received in the form of voice frequency impulses with prefix, in the form of direct-current signals without prefix.

8. A system, as claimed in claim 7, in which each digit consists of a train of single-frequency impulses and the prefix consists of a compound frequency impulse.

9. A telecommunication exchange system comprising two long-distance circuits over which voice frequency signal and dialing impulses are transmitted, receiving means at each circuit for receiving dialling impulses from a calling subscriber, means under control of said receiving means for transmitting a prefix impulse before each train of dialing impulses representing a digit, and an impulse regenerator comprising means for storing the dialing impulses and means for splitting the line and thus isolating the two voice frequency signalling circuits while said prefix impulse is transmitted.

10. A telephone system having automatic equipment and means including a trunk line connected to said automatic equipment for receiving a plurality of impulses corresponding to a dialed digit from a calling subscriber and for subsequently transmitting the same number of impulses as voice frequency current over said trunk line to the equipment to operate the same, means included in said first means and operated responsive to said received impulses to first transmit a signal of one voice frequency to seize the equipment and later transmit impulses of the same voice frequency to operate the equipment, and additional means also included in said first means operated just prior to the transmittion of said voice frequency impulses for sending a signal comprising currents of more than one voice frequency to condition the equipment for receiving said impulses of voice frequency.

ESMOND PHILIP GOODWIN WRIGHT.
WILLIAM JOHN REYNOLDS.

REFERENCES CITED

The following references are of record in the file of this patent:

UNITED STATES PATENTS

| Number | Name | Date |
|---|---|---|
| 1,575,272 | O'Neill | Mar. 2, 1926 |
| 2,188,461 | McClew | Jan. 30, 1940 |

FOREIGN PATENTS

| Number | Country | Date |
|---|---|---|
| 489,545 | Great Britain | July 25, 1938 |
| 489,609 | Great Britain | July 25, 1938 |